Patented Aug. 5, 1924.

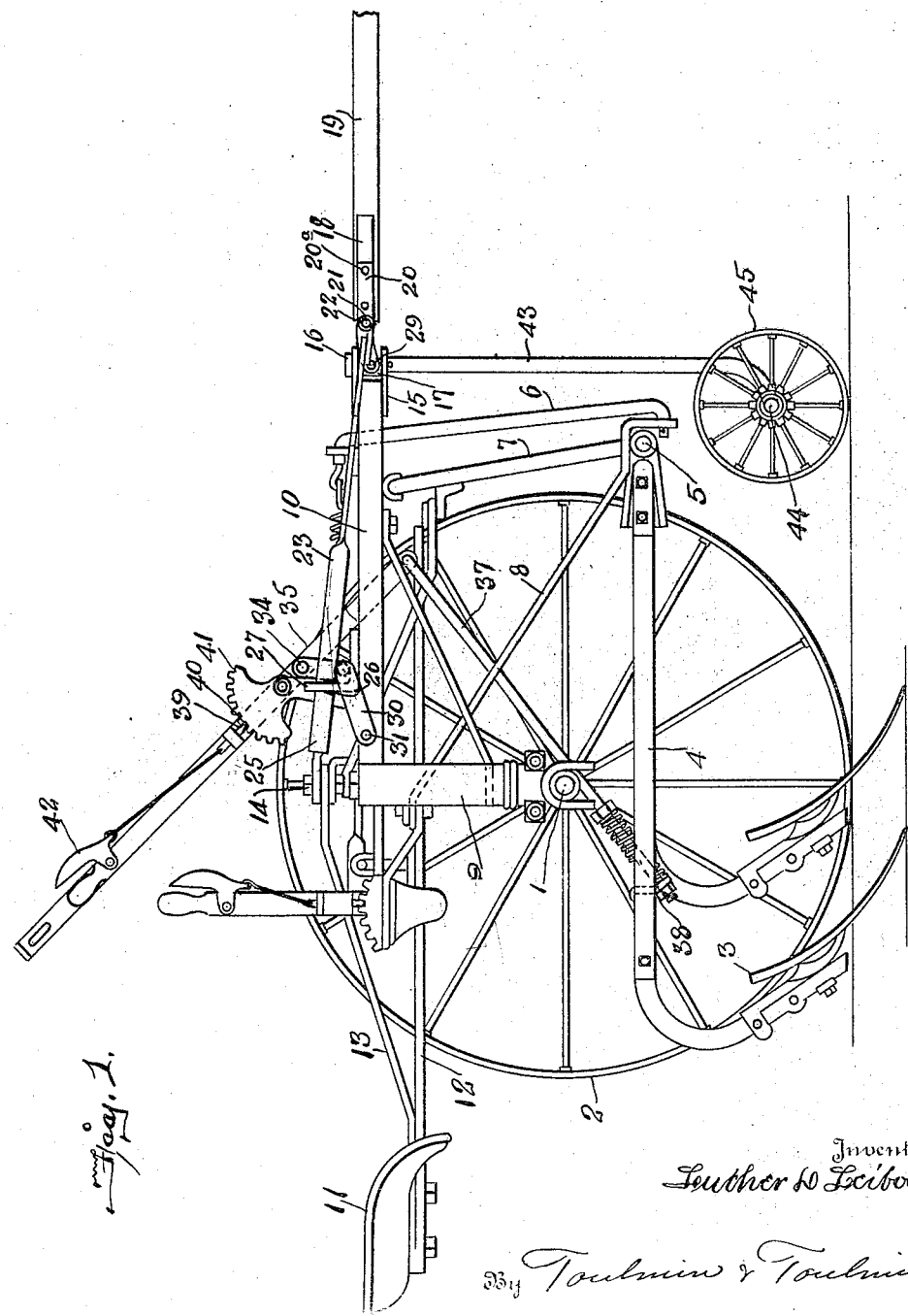

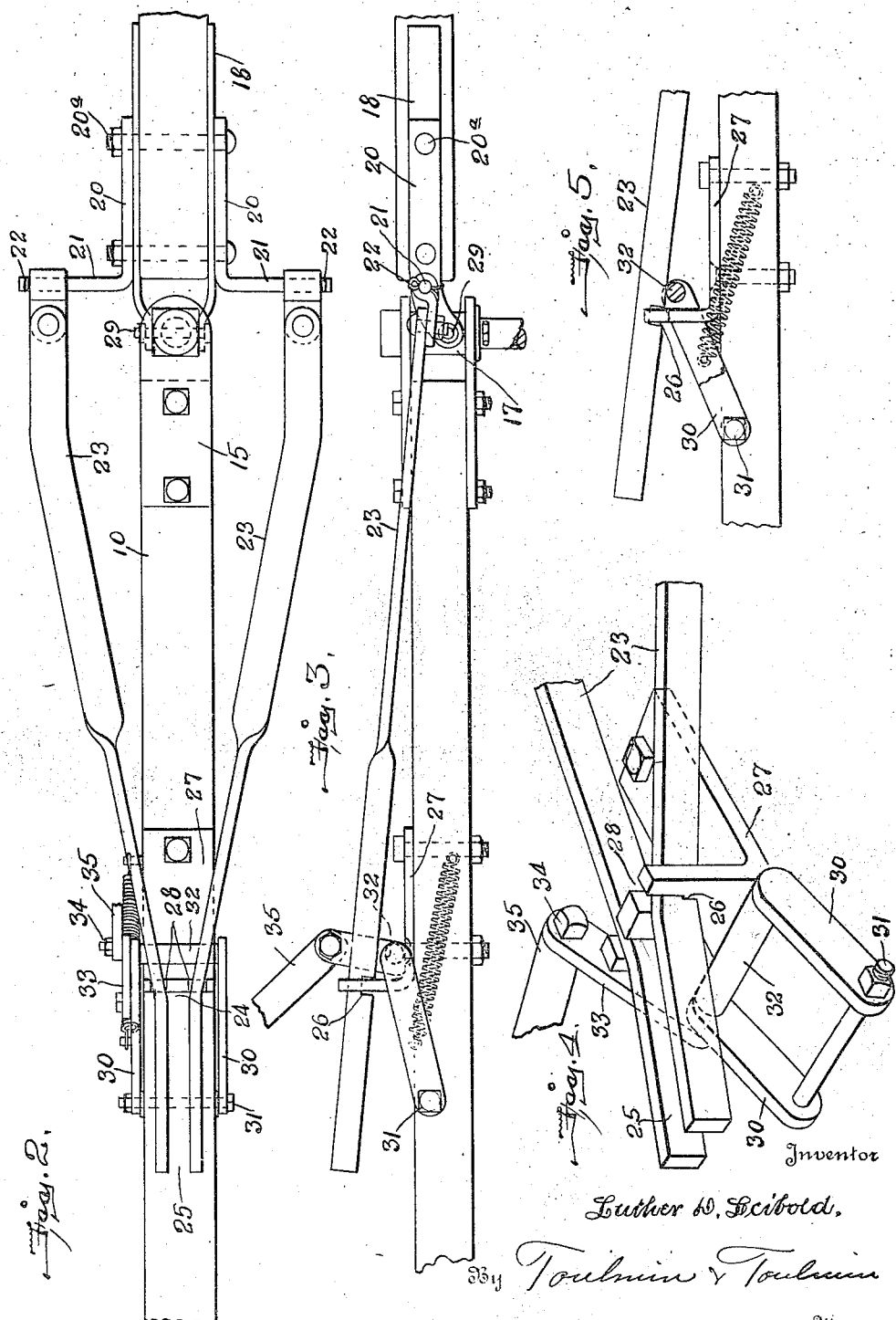

1,503,903

UNITED STATES PATENT OFFICE.

LUTHER D. LEIBOLD, OF WILLIAMSBURG, INDIANA.

DRAFT APPLIANCE.

Application filed March 27, 1922. Serial No. 547,003.

*To all whom it may concern:*

Be it known that I, LUTHER D. LEIBOLD, a citizen of the United States, residing at Williamsburg, in the county of Wayne and State of Indiana, have invented certain new and useful Improvements in Draft Appliances, of which the following is a specification, reference being had therein to the accompanying drawing.

My invention relates to draft appliances and in particular to an adjustable draft appliance.

It is an object of my invention to provide a draft appliance which in one position will maintain the elements of the draft appliance in rigid relationship to one another and in the released position will permit of relative movement of one portion of the draft appliance with respect to the other portion or portions.

It is a further object of my invention to provide a draft appliance which may be interconnected with the vehicle such as an agricultural implement so that when the implement is in its operative position the draft appliance will be in its locked position and when the agricultural implement is in its inoperative position then simultaneously the draft appliance will be unlocked.

It is my object to provide a draft appliance which will permit of the ready manipulation and maneuvering of a vehicle attached thereto in limited areas and which will permit the motive power to move while turning the vehicle substantially on its own axle and within its own length. It is a further object of my invention to provide a system of interlocking connections between agricultural implements and their operative mechanism so that as the vehicle is operating the pole of the vehicle will be rigid and when the vehicle is put in its inoperative position a portion of the pole will be adapted to swing so that sharp turns in limited areas can be made with the implement.

It will be understood, however, that my illustration and adaptation of my invention to an agricultural implement is illustrative only and that I do not desire to confine myself to that adaptation of my invention as it may be readily adapted to various other uses as for instance it may be adapted to excavators, graders, trailers, etc.

It is also my object to provide a pole that will move vertically freely so as to relieve the weight upon the necks of the horses or the weight upon the source of motive power pulling the vehicle. This movable pole will therefore have movement freely vertically and when unlocked will have movement freely laterally.

Referring to the drawings:

Fig. 1 is a side elevation of my invention applied to a cultivator;

Fig. 2 is a plan view of my draft appliance;

Fig. 3 is a side elevation of my draft appliance;

Fig. 4 is a modified construction in perspective of the locking and unlocking feature of the draft appliance; and, Fig. 5 is a detail view of the locking and unlocking features of the appliance in side elevation.

Referring to the drawings in detail, 1 is an axle of a typical vehicle supported by the wheels 2. In the present instance I have selected a two-horse cultivator having one or more gangs of plows such as 3 supported on the frame 4 adapted to swing vertically about the pivot or shaft 5. This forward end of the gang 4 is supported by the U-shaped link 6 of any customary construction in cultivators of this type and is also supported by the members 7 and positioned by the rod 8. The main frame of the vehicle is supported on the axle 1 through the members 9 to which is attached rigidly the stub pole 10. The seat 11 is mounted on the seat support 12 and 13 which is pivoted at 14 to the frame 9 and stub pole 10. The forward end of the stub pole carries a bracket 15 through which is inserted a king pin 16. This king pin passes through an eye 17 carried by the arms 18 of the swinging pole 19. Mounted on the swinging pole are a pair of brackets 20 on either side thereof embracing the arms 18, the whole being retained on 19 by the bolts 20$^a$. These brackets 20 travel a portion of the distance parallel to 19 and then at 21 at right angles thereto. Pivotally mounted on the outer ends of 21 and retained by the pins 22 are the locking arms 23 which project backwardly and inwardly until they converge at 24 and then travel parallel to one another at 25. On the underside of 23 is a notch 26 adapted to engage with the upper side of the locking bracket 27 which is mounted upon and bolted to the stub pole 10. The notch 26 finds a companion notch 28 in 27 and engages therewith.

In the locked position the parts will be shown as in Figures 2, 3, 4 and 5. The notches 26 and 28 will be engaged with one another so that the pole 19 will be held rigidly by the arms 23 with respect to 10.

When it is desired to permit 19 to swing on the king pin 16 with respect to the pole 10 the unlocking arrangement is brought into play.

It will be understood as to 16 that a pin 29 may be passed through 16 and the blocks 17 as well as the arms 18 to prevent the parts from becoming disassembled.

As to the unlocking mechanism, I provide a pair of links 30 pivoted at 31 on the stub pole 10. The outer end of these links are joined by a cross member 32 adapted to engage with the underside of 23 as at 25. This cross member 32, together with the links 30 is elevated by a link or links 33 pivotally connected to 30 at one end and pivotally connected at 34 at the other end to the lever 35 which is pivotally connected to and operates through the rod 37, the rear end of the gang 4 supporting the shoes or plows 3. The numeral 37 is attached at 38 to beam 4 for the purpose of elevating it about the pivotal point 5.

The position of 35, and therefore 37, with the gang is fixed by the locking of the pawl 39 in the detent 40 of the segment 41 mounted rigidly on the implement. This construction may be of any well known character. The detent is operated by the releasing handle 42 at the upper end of 35.

It will be thus observed that when the gangs are lifted out of the ground to permit the implement to turn simultaneously, the operation of the lever 35 for that purpose will elevate the cross member 32 and unlatch the arms 23 lifting the notches 26 and 28 out of engagement with one another and permitting the members 23 to slide in the bracket 27 and also permitting the pole 19 to swing about upon the king pin 16.

The result of this is that the implement, instead of turning in a large arc which would be necessary if the pole were rigid, can turn substantially in its own length about the center of the machine as an axis thus greatly economizing in the area needed for its manipulation resulting in more ground being cultivated, seeded or plowed depending upon the type of implement used.

When this invention is adapted to a trailer it will permit of the bringing of the trailer into a position of restricted area such as between two loading platforms and then its removal from that restricted location by a motor truck or any other source of motive power without the necessity of a considerable area to turn the vehicle so equipped.

It will be understood that my draft appliance is adaptable to horse drawn or power drawn vehicles.

I provide a truck having a vertical standard 43 which is a continuation of the pin 16. This truck has a cross member or axle 44 connected at the lower end thereof with wheels 45 on either end of the axle.

It will be also noted that at the point of connection between the arms 18 there is a bolt 29 passing through 16 thus permitting the swinging pole 19 to move freely vertically about 43 and when released to move freely with the member 16 and 43 about the axis of 16.

Having thus fully described my invention, what I claim as new and desire to secure by Letters Patent, is:

1. In an implement, the combination of a movably mounted implement carrying beam, a stationary pole, a swinging pole pivotally connected with the forward end of the stationary pole for substantially horizontal swinging movement, rearwardly extending bars connected with said swinging pole, a guide means for the rear ends of said bar equipped with holding means for normally maintaining the same against longitudinal movement, means for moving said beam into inoperative position, and means connected with said first named means for lifting the rear ends of said bars out of engagement with the holding means whereby to permit movement of the swinging pole.

2. In an implement, the combination of a movably mounted implement carrying beam, a stationary pole, a swinging pole pivotally connected with the forward end of the stationary pole for substantially horizontal swinging movement, rearwardly extending bars connected with said swinging pole, a guide means for the rear ends of said bars equipped with holding means for normally maintaining the same against longitudinal movement, means for moving said beam into inoperative position, and means connected with said first named means for lifting the rear ends of said bars out of engagement with the holding means whereby to permit movement of the swinging pole, said first named means including a notched element adapted to be engaged by notches in the lower edges of the bars.

3. In an implement, the combination of a movably mounted implement carrying beam, a stationary pole, a swinging pole pivotally connected with the forward end of the stationary pole for substantially horizontal swinging movement, rearwardly extending bars connected with said swinging pole, a guide means for the rear ends of said bars equipped with holding means for normally maintaining the same against longitudinal movement, means for moving said beam into inoperative position, and means connected with said first named means for lifting the rear ends of said bars out of engagement with the holding means whereby to permit movement of the swinging pole, said second named means comprising a pivoted lever equipped with latch mechanism, a connection between the lever and the beam, and a pivoted member movable by the lever and engaging beneath the rear ends of said bars.

4. In combination, a vehicle, a stationary pole, a swinging pole pivoted thereto, locking arms carried by said pivoted pole, adapted to engage with a locking bracket on the stationary pole, a locking bracket, means thereon for engaging with corresponding means to lock the bracket to the locking arms, a swinging member pivoted on said stationary pole for unlocking the locking arms from the bracket, means to elevate said unlocking member to unlock the arms from the bracket, said means consisting of means to simultaneously place in inoperative position operative mechanism connected to the vehicle, so that the unlocking of the locking arms will take place simultaneously with the movement of the operative mechanism into inoperative position, and resilient means for normally maintaining said unlocking member in its inoperative position.

5. In combination, a vehicle, a stationary stub pole, a moving pole pivoted at the end thereof, means on said moving pole adjacent the pivotal connection for supporting locking arms at a point removed from the swinging pole, said locking arms converging to a point on the stationary pole where they are located closely adjacent to one another, a locking plate on said stationary pole, means on the underside of said arms and on said plate for locking the arms in a fixed position relative to one another, whereby the major axis of the stub pole and of the moving pole will coincide on the same line, links pivoted on said stationary pole, a cross member therebetween beneath said locking arms to lift said locking arms out of engagement with the locking bracket, resilient means to maintain said links and cross member in inoperative position, a link connected to said links and cross member at one end and to an operating lever at the other end, whereby when the operating lever is actuated to lift said links and cross member the locking arms will be unlocked and the swinging pole will be allowed to move about its pivotal point.

6. In combination, a vehicle, a stationary stub pole, a moving pole pivoted at the end thereof, means on said moving pole adjacent the pivotal connection for supporting locking arms at a point removed from the swinging pole, said locking arms converging to a point on the stationary pole where they are located closely adjacent to one another, a locking plate on said stationary pole, means on the underside of said arms and on said plate for locking the arms in a fixed position relative to one another, whereby the major axis of the stub pole and of the moving pole will coincide on the same line, links pivoted on said stationary pole, a cross member therebetween beneath said locking arms to lift said locking arms out of engagement with the locking bracket, resilient means to maintain said links and cross member in inoperative position, a link connected to said links and cross member at one end and to an operating lever at the other end, whereby when the operating lever is actuated to lift said links and cross member the locking arms will be unlocked and the swinging pole will be allowed to move about its pivotal point, links connected at the other end of the actuating lever connected to operative mechanism on the vehicle to actuate said mechanism when the locking arms are actuated.

7. In an agricultural implement, the combination of a frame, axle and wheels, a stationary stub pole mounted on said frame, a ground engaging implement swung on said agricultural vehicle, means for placing said ground engaging implement in operative and in inoperative position, means connected with said means for moving into unlocked position locking arms, locking arms having their other ends connected to a swinging pole, a swinging pole connected to the outer end of the stationary pole, a locking bracket to engage said locking arms, said bracket being mounted on the stationary pole, whereby when the ground engaging implement is lifted out of engagement with the ground simultaneously the locking arms will be unlocked and the swinging pole will be adapted to swing about the end of the stationary pole.

8. In a wheel supported element, the combination of a movably mounted beam carrying implement elements, lever mechanism operatively connected with said beam for swinging the same into operative or inoperative position, a stationary pole, a notched bracket member mounted on said pole, a horizontally movable swinging pole pivotally connected with the forward end of the stationary pole, angular members projecting laterally from the swinging pole, bars pivotally connected with said angular members and having spaced parallel rear ends slidable along said bracket with their lower edges notched for engagement within the notches in the former, and links pivotally connected and operatively connected with said lever, said links being connected by an element bridging and disposed below said bars whereby to lift the same and release the notches when the beam is raised.

9. In an implement, a pivoted beam carrying implement elements, a lever connected with the beam for effecting movement thereof, a stationary pole, a guide member on the stationary pole, a vertically and horizontally movable pole pivoted upon the forward end of the stationary pole, rearwardly extending rocking arms pivotally connected at opposite sides of the movable pole and slidably engaged on the guide member, co-acting means on the guide member and bars for normally holding the latter rigid, and a pivoted link mechanism operatively connected with said lever and located beneath the bars whereby to lift the same into released position when the beam is lifted.

10. In combination, in a vehicle, a stub pole rigidly connected thereto, a swinging pole pivoted to said stub pole so that in its unlocked position it may move freely laterally and in its locked position will be locked rigidly on the same axis as the stub pole and so arranged that at all times it may move freely vertically, locking arms connected to said pole adapted to engage with the locking means on the stationary pole, means on the swinging arms and on the locking means for effecting a locking engagement therebetween, means for disconnecting said locking means and locking arms, whereby the swinging pole may move freely laterally with respect to the stationary stub pole, said disconnecting means consisting of a swinging member adapted to be elevated to lift the locking arms out of engagement with the locking means.

In testimony whereof, I affix my signature.

LUTHER D. LEIBOLD.